No. 631,721. Patented Aug. 22, 1899.
W. JOHNSON.
VOTING MACHINE.
(Application filed Nov. 15, 1895.)

(No Model.) 11 Sheets—Sheet 1.

Attest
C. S. Middleton
R. C. Ourand

Inventor
Werner Johnson
by Walter Donaldson
Atty.

THE NORRIS PETERS CO., PHOTO-LITHO., WASHINGTON, D. C.

No. 631,721. Patented Aug. 22, 1899.
W. JOHNSON.
VOTING MACHINE.
(Application filed Nov. 15, 1895.)
(No Model.) 11 Sheets—Sheet 2.

No. 631,721. Patented Aug. 22, 1899.
W. JOHNSON.
VOTING MACHINE.
(Application filed Nov. 15, 1895.)
(No Model.) 11 Sheets—Sheet 3.

Fig. 4.

Attest
C. S. Middleton
R. E. Onrand

Inventor
Werner Johnson
by Walter Middleton
Attys.

No. 631,721. Patented Aug. 22, 1899.
W. JOHNSON.
VOTING MACHINE.
(Application filed Nov. 15, 1895.)

(No Model.) 11 Sheets—Sheet 4.

Fig. 5.

Attest
C. S. Middleton
R. C. Ourand

Inventor
Werner Johnson
by Walter Donaldson
Attys.

No. 631,721. Patented Aug. 22, 1899.
W. JOHNSON.
VOTING MACHINE.
(Application filed Nov. 15, 1895.)

(No Model.) 11 Sheets—Sheet 5.

Attest
C. S. Middleton
N. C. Ourand

Inventor
Werner Johnson
by Waller Donaldson
Atty.

No. 631,721. Patented Aug. 22, 1899.
W. JOHNSON.
VOTING MACHINE.
(Application filed Nov. 15, 1895.)
(No Model.) 11 Sheets—Sheet 6.

No. 631,721. Patented Aug. 22, 1899.
W. JOHNSON.
VOTING MACHINE.
(Application filed Nov. 15, 1895.)
(No Model.) 11 Sheets—Sheet 7.

No. 631,721. Patented Aug. 22, 1899.
W. JOHNSON.
VOTING MACHINE.
(Application filed Nov. 15, 1895.)
(No Model.) 11 Sheets—Sheet 8.

No. 631,721. Patented Aug. 22, 1899.
W. JOHNSON.
VOTING MACHINE.
(Application filed Nov. 15, 1895.)
(No Model.) 11 Sheets—Sheet 9.

Attest
C. S. Middleton
R. C. Ourand

Inventor
Werner Johnson
by
Mallern Daubott
Attys.

THE NORRIS PETERS CO., PHOTO-LITHO., WASHINGTON, D. C.

No. 631,721. Patented Aug. 22, 1899.
W. JOHNSON.
VOTING MACHINE.
(Application filed Nov. 15, 1895.)
(No Model.) 11 Sheets—Sheet 10.

No. 631,721. Patented Aug. 22, 1899.
W. JOHNSON.
VOTING MACHINE.
(Application filed Nov. 15, 1895.)
(No Model.) 11 Sheets—Sheet 11.

Attest
C. S. Middleton
Alye Scott

Inventor
Werner Johnson
by Waller Donaldson & Co
Attys.

UNITED STATES PATENT OFFICE.

WERNER JOHNSON, OF NORTHAMPTON, MASSACHUSETTS.

VOTING-MACHINE.

SPECIFICATION forming part of Letters Patent No. 631,721, dated August 22, 1899.

Application filed November 15, 1895. Serial No. 569,034. (No model.)

*To all whom it may concern:*

Be it known that I, WERNER JOHNSON, a citizen of the United States, residing at Florence, in the county of Hampshire and State of Massachusetts, have invented certain new and useful Improvements in Voting-Machines, of which the following is a specification, reference being had therein to the accompanying drawings.

It is the object of my invention to provide a voting-booth having efficient safeguards against dishonest or duplicate voting and in which the voting mechanism will be locked after the vote has been cast, the machine including groups of voting mechanisms and each group containing a plurality of voting mechanisms which may be set so that one or more votes may be cast by the voter in each group, according to the predetermined plan or requirements, each group being locked to the voter after he has operated the predetermined number of mechanisms in that group.

My booth comprises a voting-compartment having the voting keys or handles therein, an entrance-door with connections to the voting mechanisms to reset the same upon the entrance of each voter into the booth, an exit-compartment separated from the voting-compartment by a self-locking door, a final exit-door from the exit-compartment, and means for holding said door against opening until the intermediate door is closed, said means comprising a platform for holding the exit-door closed and arranged adjacent thereto to be stepped upon by the voter, the intermediate door holding the platform against depression through intermediate connections until the intermediate door is closed and the voting-compartment thus locked to the voter who has just left the same.

My booth also includes a lock for the main entrance-door arranged to be operated only when the main exit-door is opened, thus admitting a new voter only after the person having cast his vote has left the booth.

My voting mechanism comprises means for locking the keys or handles in operated position, so that it may be seen what votes have been cast, and means for resetting the machine.

In the accompanying drawings.

The registering-wheels 31 are arranged on axles carried in extensions $31^\times$ of vertically-movable rods 1, guided in the frame $1^\times$ and having cross-bars $1^a$ at their upper ends, the rods being normally pressed up by springs $a$. These cross-bars carry depending pivoted pawls $b$, adapted to engage a ratchet-wheel $c$, which forms part of the stop motion, which, as hereinafter described, controls the number of keys which may be operated in each group. The bar 1 is depressed when its corresponding handle or key 2 is pulled out by the voter in casting his vote, the handle being attached to a rod $d$, slotted at its rear end and engaging a pin 20 (see upper part of Figs. 3 and 15) on an arm 4, turning loosely on a shaft 3, said arm having a slotted extension 4' engaging a pin on the bar 1. In the downward movement of the bar 1 the registering-wheel is depressed and its ratchet $e$ engages a pawl 30, depending from a rod 30', so that the wheel will be turned one-tenth of a revolution, and as the wheel rises again under the action of the spring $a$ the tooth $35^\times$ of the detent 35 on the rod 30' will enter one of the notches in the wheel and retain it in moved position. The depending pawl 30 is held in position against the ratchet by the spring 30''', and the detent 35 is fastened to the pawl-arm by a screw 30''', Figs. 8 and 9.

The registering-wheel is made up of a series of disks arranged side by side on the same axle, with carrying mechanism between them, so that each time the first disk makes one complete revolution the second disk will be moved forward one step, the depending pawl engaging the ratchet on the first disk only and the movement of this disk being carried to the other disks, as will be described hereinafter. Each disk is notched, and these notches are engaged by the detent 35, having a broad tooth $35^\times$, engaging the notches of all the wheels each time the wheel rises after being turned. Should it happen that the handle is not pulled sufficiently to make the first disk move a complete step and the handle released, the notch or groove in the first disk would not aline with the notches in the other disks, and therefore the detent could not engage the disks. To avoid this, a pawl 39 is provided on the shaft 30', Fig. 9, which as the wheel rises will engage the notch of the moved wheel and return the same to its former position. The ends of the pawl 39 and detent 35 always bear the same relation to each other, and the disk will be turned back to make its notch register with all the others and with the tooth of the detent 35. There are three of these pawls 39, (see Fig. 8,) one for each disk, and they are pressed by springs $39^\times$, connected with a rib 39' on the detent 35, Figs. 8 and 9.

In order to prevent a second operation of the same key by the same voter, a dog $f$, loose on a shaft $g$, engages the rack $h$ of the bar 1, so that when the bar rises the dog engaging the teeth will hold the bar and arm 4 rigid against a second operation until the parts are reset for the next voter. The dog is normally held out of engagement with the rack-teeth by a detent $i$, pivoted loosely on a shaft 14 and having a hooked end to engage shoulders $k$ on the dog. The detent $i$ is released from the dog by the end of the cross-bar $1^a$ engaging the upright arm $i'$ of the detent, the contacting ends of the arm and cross-bar being inclined. This release of the dog takes place when the bar 1 moves down, because the inclined end of the bar $1^a$ will act to force back or outwardly the upright arm $i$, thus releasing the dog, and the dog then engages the rack, the teeth of which will allow the bar to rise, but will prevent a second downward movement of the bar until the dog has been released in resetting the machine.

Figure 2:
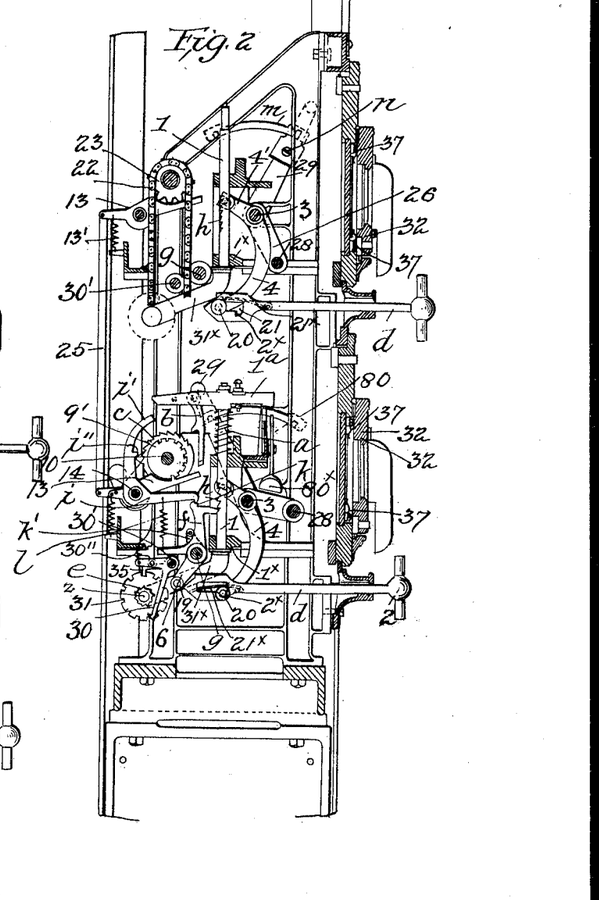
Fig. 2 is a vertical section through the voting mechanism from front to rear.
Figures 15, 16:
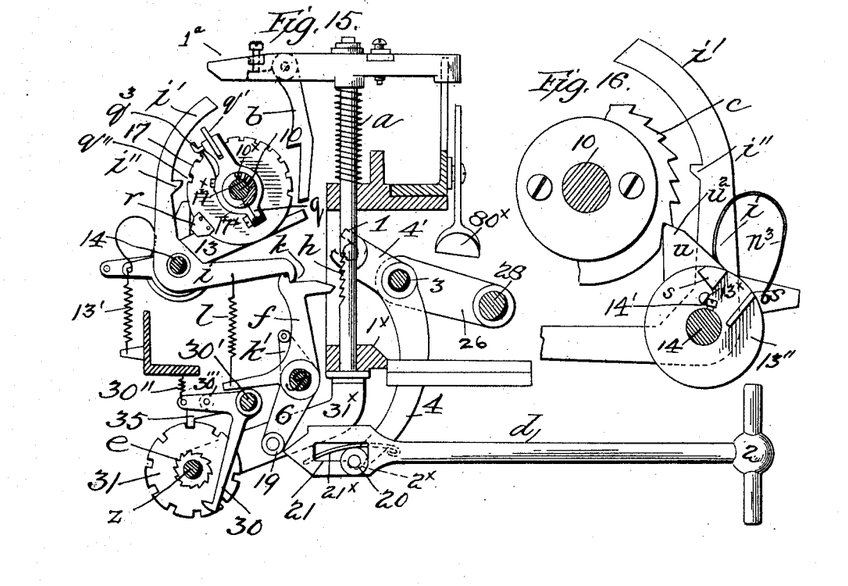
Fig. 15 is a detail view of the key mechanism ready for operation.
Figs. 16 and 17 are views of details.

Fig. 2 shows in its upper half the key and mechanism ready to be operated, parts of the mechanism, however, being omitted, while in the lower half the mechanism has been operated and the vote registered, said mechanism being now locked against a second operation until reset for the next voter. Fig. 15 also shows the parts ready for operation. The handle or key at the lower part of the figure is at its extreme inward position, indicating at a glance that this key has been operated, while in the upper half the key is intermediate of its extreme inward and outward position, showing that this key is ready to be pulled. When so pulled to its extreme outward limit, the registering mechanism is operated. Bringing the key back, the arm 4 will return to its former position, but the key will have an additional inward movement allowed by the slot-and-pin connection 21 20, and at its end the pin 20, which is now stationary, will lie over the notch $2^\times$ at the forward end of the slot, and the spring $21^\times$, attached to the slotted end of the key, will raise said slotted end to engage the pin with the notch, thus locking the key in its extreme inward position until the mechanism is reset, it being understood that the pin 20 and arm 4 are held locked at this time through the dog engaging the rack on the rod 1. From the above it will be seen that normally the key when not operated is in the intermediate position of the upper half of Fig. 2. The voter to operate the mechanism pulls this key out, as before stated. He then pushes it in all the way, as shown in the lower half of Fig. 2, where it becomes locked, and this indicates that it has been operated. The locking of the key when pushed all the way in is, as before stated, effected by means of the pin-and-slot connection described. This mechanism is shown in Fig. 2 and in Fig. 15.

In resetting the mechanism after the vote has been cast the dog $f$ is released from the rack of rod 1 by an arm $k'$, fixed on the shaft $g$, and adapted when the shaft is turned to engage the tail of the dog and retract the dog from the rack and cause the same to be engaged and held out of action by the detent $i$, which springs into engagement with the retracted dog. The detent and dog are under tension of a spring $l$, connecting them and tending to force both of them to their work. The rack-rod 1 is now free for another voting action, and at the same time that the dog is freed the key is unlocked from the position shown in lower half of Fig. 2 and moved to the position shown at the upper half of said figure by the arm 6, fixed on resetting-shaft $g$, and having a roller 19 engaging the inclined slotted end of the key, forcing the same first downward to release the pin 20 from the notch and then forward to normal position, with the rear end of the slot engaging the pin. All the keys which have been operated by the voter will stand a little farther in, and thus show that they have been moved.

Figure 4:
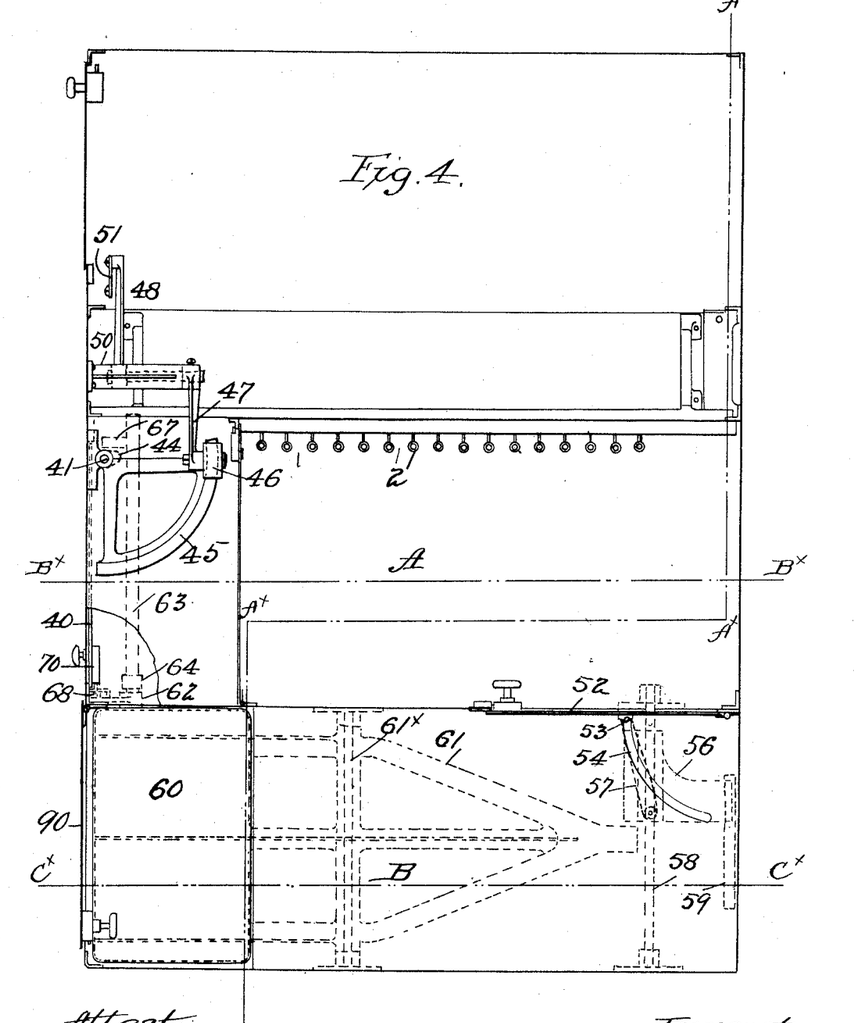
Fig. 4 is a top view of the booth.
Figure 5:
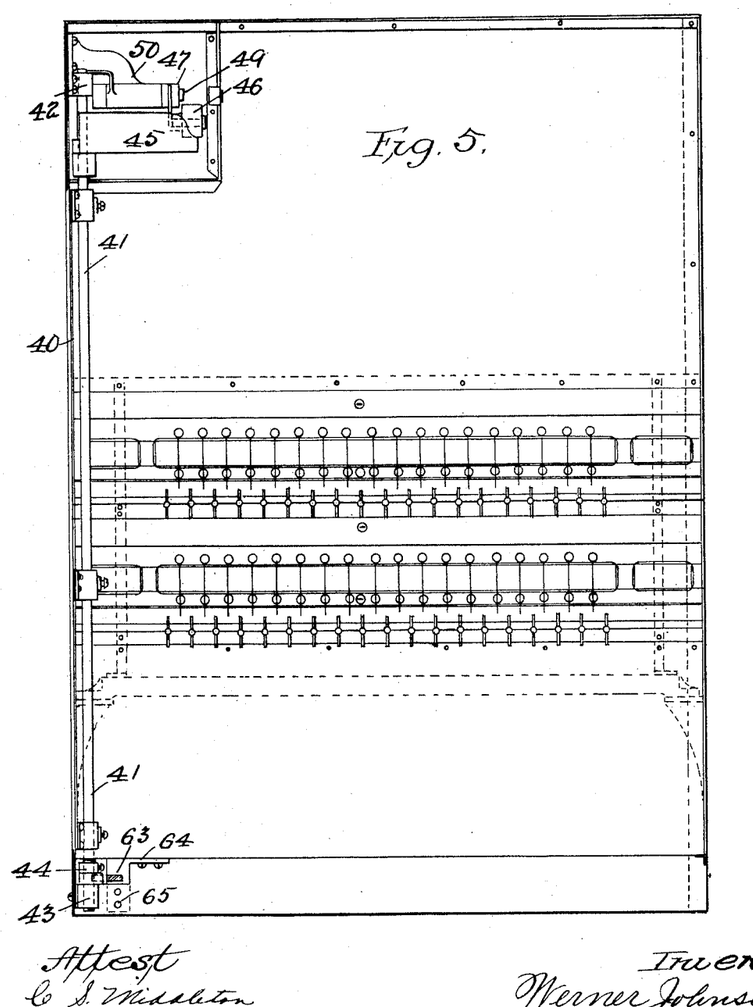
Fig. 5 is a vertical section on line $B^\times B^\times$ of Fig. 4.

I have shown in Fig. 4 the apparatus in place within the booth, the row of keys corresponding to the candidates being shown at 2, and in Fig. 2 I show an upper and a lower set of keys.

Figure 13:
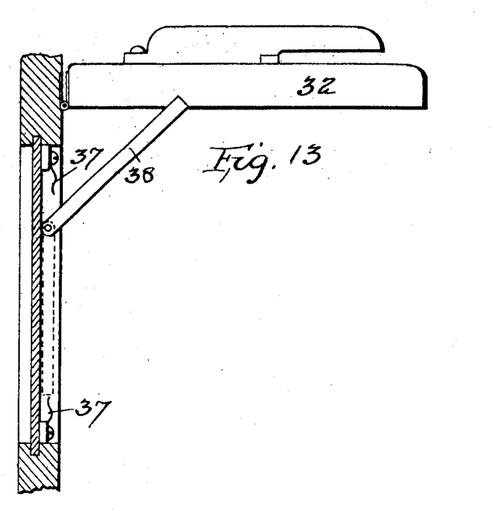
Fig. 13 is a detail view of a door-holding catch.
Figure 14:
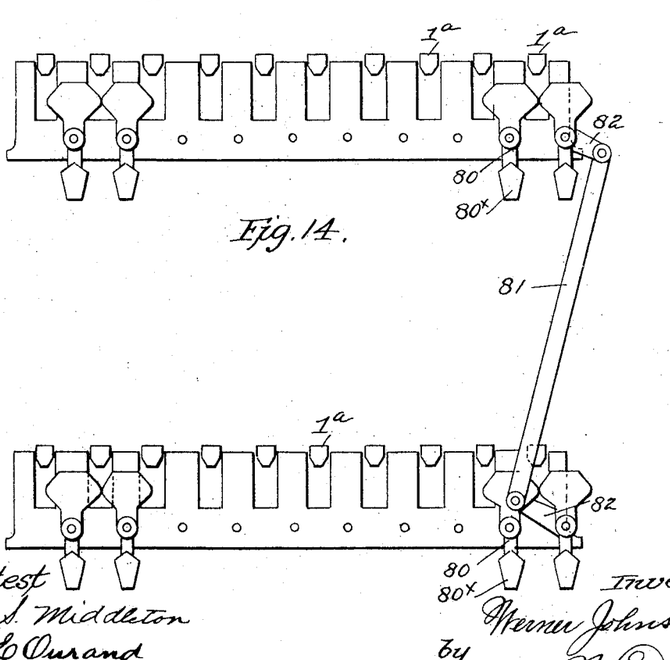
Fig. 14 is a detail view of stops to prevent two keys being operated at once.

The names of the candidates are placed on slips or cards held directly above the keys by means of clips 37 in frames covered by hinged doors 32, having glass fronts. The doors may be swung upon their hinges and held by catches 38, Fig. 13.

In order to prevent more than one key being operated at the same time, I provide pivoted cam-stops 80 on the frame having inclined edges at their top and a weight $80^\times$ to hold the stops vertically. The stops lie edge to edge and the cross-bars $1^a$ have their rear ends V-shaped on their lower edges and in line with the spaces between the cam-stops, so that when one cross-bar is depressed the cam-stops will be separated by the V-shaped edge engaging the inclines in the stops; but if two cross-bars are depressed at once the cam-stops will form a lock and prevent the further depression of both bars. When an upper and lower set of keys is used, as in Fig. 2, it is also desired that no two keys be operated at once, and for this purpose the outer stop-cams of the upper and lower series are connected by links 81 and arms 82. After the voting is over the whole mechanism of each row of keys may be locked by a rod 28, (shown in locking position, upper part of Fig. 2,) carried by arms 26, fixed on the shafts 3 just inside of the end frames of the voting mechanism, said rock-shaft being operated by an arm 29 outside the frame, which may be locked at either end of the segment $m$ by a key-lock $n$ on the arm. In locking position the shaft 28 bears against all the arms 4 of the set and prevents them from being moved by the keys. The unlocked position of the shaft 28 is shown in the lower part of Fig. 2.

Figures 8, 9:
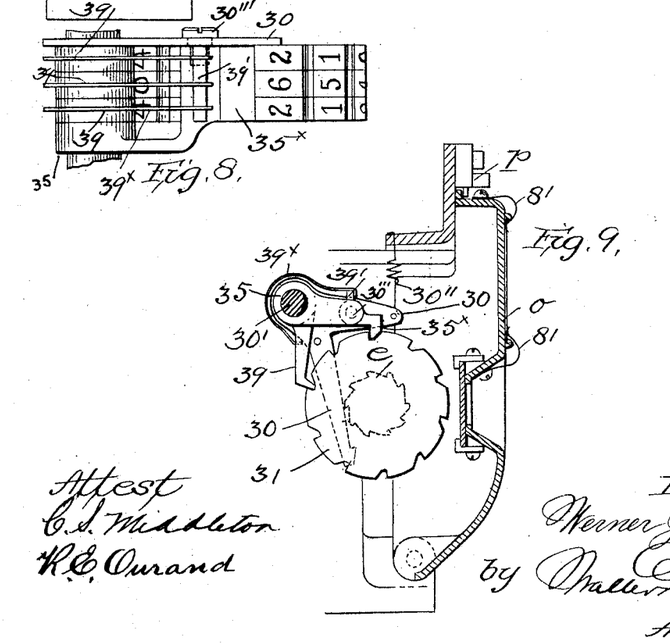
Figs. 8, 9, and 10 are details of the counter or registering mechanism.
Figure 10:
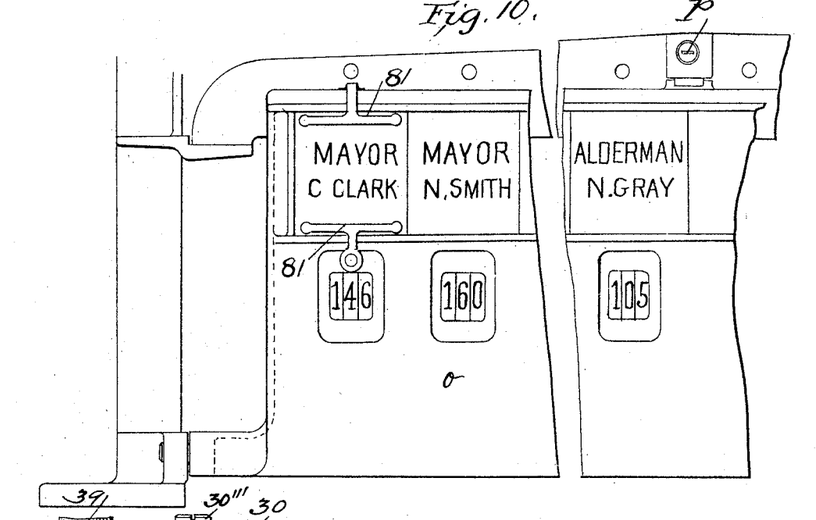

As shown in Figs. 9 and 10, a shield $o$ is placed across the machine, over the counting or registering wheels, having a slot in front of each wheel closed by a glass, a clip 81 being provided to hold the name-card of the candidate to whom the particular counter belongs. The shield is hinged at the bottom and locked at the top by a key-lock $p$, and the counters, while thus being visible to the inspectors, are out of reach of the same. In resetting the registering wheels or counters the handle or key is pulled out a little way, so as to release the notched disks from the detent 35, and then after the shield is unlocked and swung down the disks may be turned by hand back to zero. Before the keys or handle can be pulled out so as to release the counting-wheels from the detent it is necessary to release the locking-bar 28, so that even were the shield unlocked after the voting is over the disks could not be turned until after the arm 29 and bar 28 were unlocked.

Figure 3:
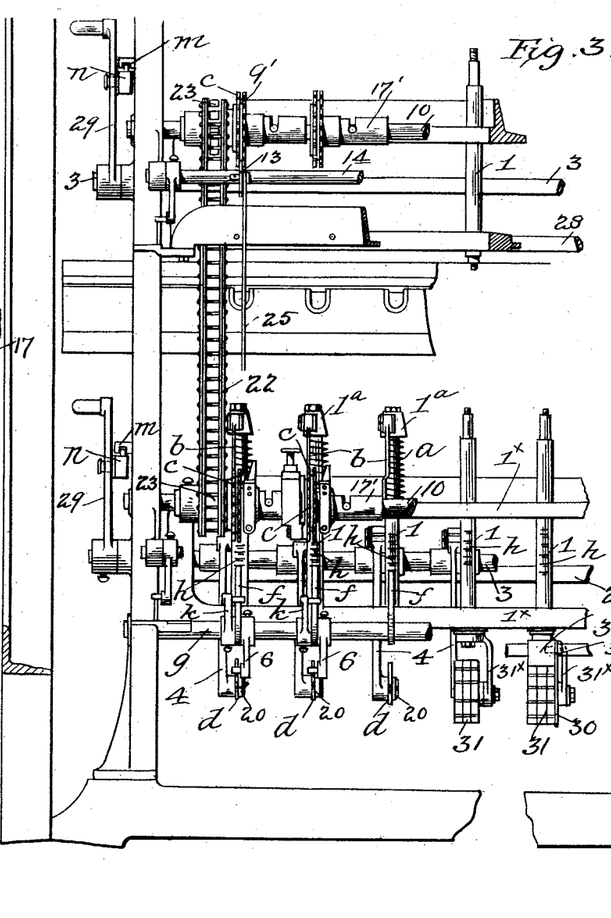
Fig. 3 is a rear view of the machine of Fig. 2.
Figure 11:
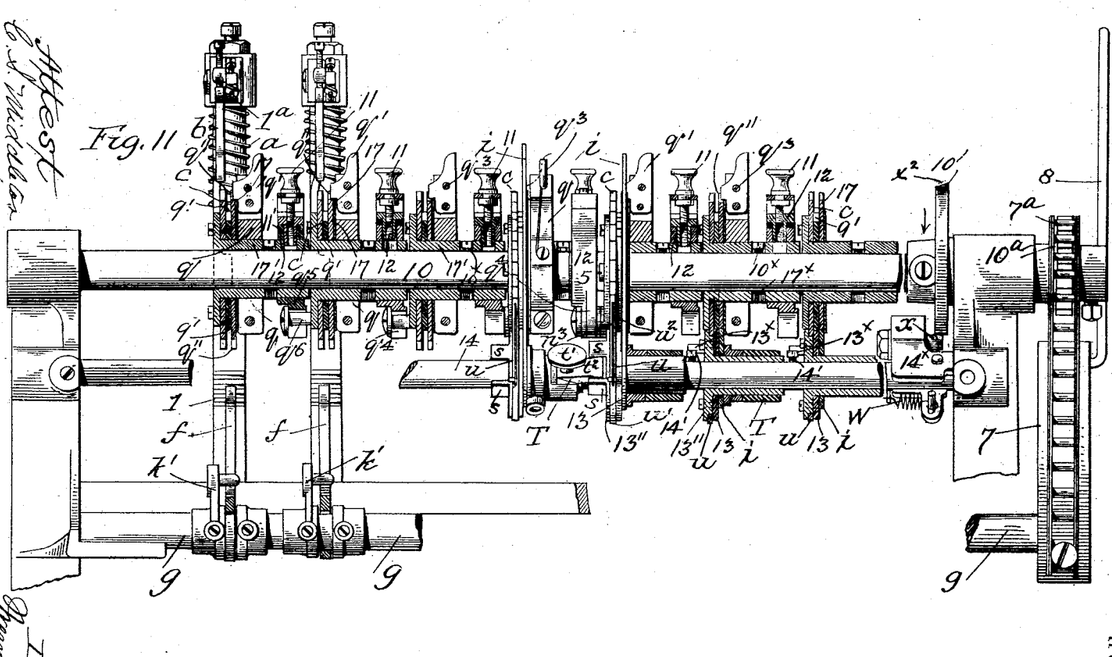
Fig. 11 is a view of the stop-motion mechanism, partly in longitudinal section.
Figures 17, 19:
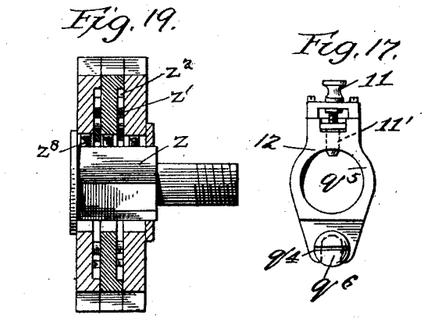
Figs. 18 and 19 are views of the counter.
Figures 20, 22, 23:
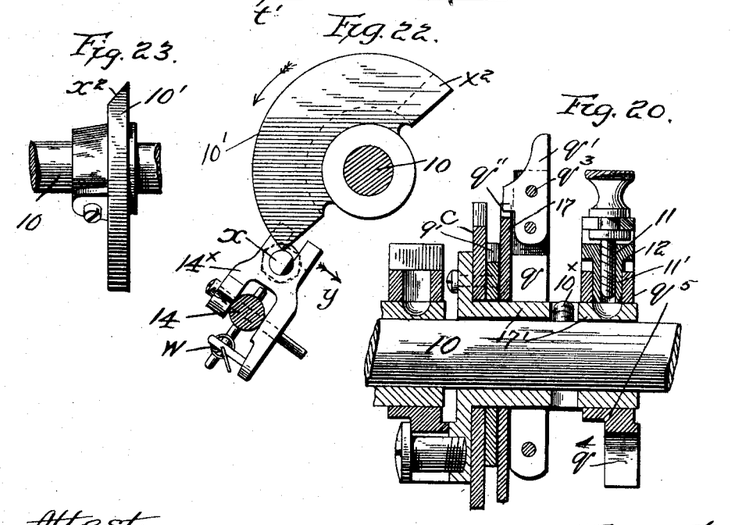
Fig. 20 is a detail view of the stop-motion mechanism, showing the adjustable dial and attached parts.
Fig. 22 is a view of the means for transmitting the movement from one shaft to the other in resetting the parts.
Fig. 23 is a detail of the same.
Figure 21:
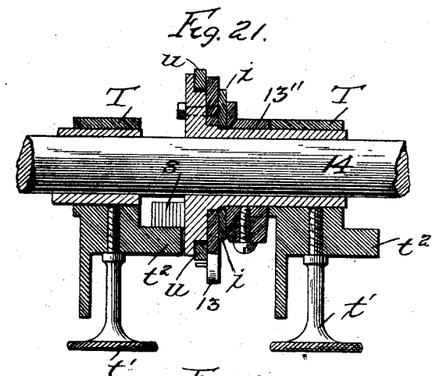
Fig. 21 is an enlarged detail of the manner of holding the detents on the shaft.

As before stated, I provide a series of keys, and each key has connected thereto a counter or registering wheel, with the attached mechanism, including the rack-rod 1, the dog, the dog-detent, the arms 4 and 6, the cross-bar $1^a$, and the stop-cam 80. Each candidate has a separate key, and the keys are divided up into groups. For instance, one group may be composed of two keys on the left of Fig. 4, with their attached counters and intermediate mechanism, while the four keys immediately to the right may comprise another group. Of the first group of two keys there will be a candidate for each key opposing each other, and this group of keys must be so arranged that when one key is operated and released the other key for the opposing candidate cannot be operated by the same voter and it will be necessary for him to leave the booth and another voter to enter before either key of this group can be operated. On the next group of four keys we will suppose that there are four candidates running for three offices, and this group must therefore be arranged so that each voter may operate three of the keys of this group, but the fourth key will be locked by the movement of the third key. This locking effect is secured as follows: Taking, for instance, the group of two keys at the left of the series, the first key mechanism at the left of Fig. 11, when operated, is locked, as already explained, against a second operation by the release of the detent $i$, which in turn releases the dog $f$ to engage the rack of the rod 1. The release of the detent $i$ of the first key is effected through direct contact of the cross-bar $1^a$ therewith; but in order to lock the second key by the act of operating the first I apply to each set of key mechanisms a stop-motion consisting of a ratchet-wheel $c$, fixed, as shown in Figs. 3, 11, and 20, on a sleeve $17'$, loose on a shaft 10, which extends entirely across the machine, said ratchet having fixed thereto a detent-wheel $9'$ to be engaged by a detent 13, loose on a rod 14, also extending across the machine. (See Figs. 2, 3, and 15.) Alongside this detent-wheel $9'$ there is a dial 17. Between this dial-wheel and the ratchet-wheel $c$ of the next key to the right the sleeve $17'$ extends, which is loosely held on the shaft 10, said sleeve being rigidly connected to the ratchet of the first key and adjustably connected to the dial of the first-key mechanism by an arm $q$, fixed on the loose sleeve having a pawl $q'$ entering notches $q''$ in the dial, the pawl being held in any desired notch by a spring locking-pin $q^3$. The sleeve is also detachably connected to the ratchet-wheel $c$ of the second-key mechanism by a clutch 12, Figs. 11, 17, and 20, consisting of a collar $q^5$, having a fork $q^4$ engaging a pin $q^6$ on the ratchet, said collar being fixed to the sleeve by a thumb-screw 11 operating a pin $11'$, guided in the collar and having a pointed end entering a socket in the sleeve.

When the first key is operated, the depending pawl $b$ thereof engages the first ratchet-wheel $c$ and turns the same one step, and at the same time the end of the cross-bar $1^a$ engages and operates the detent $i$ to throw the locking-dog $f$ of the first key into locking position to lock the bar 1 when it rises. The movement of the ratchet $c$ has the same effect on the locking-dog of the second-key mechanism, for this one-step movement of the ratchet is communicated through the sleeve 17' and clutch to the second ratchet, moving it, with its sleeve, one step, and as the arm $q$ of this second set of mechanism is fixed to the sleeve of the second ratchet it will turn therewith and move the notched dial one step, which is sufficient to bring a cam $r$ on the dial, Fig. 15, to operate against a finger $i''$ on the detent $i$ of the second-key mechanism, thus releasing the same from the second dog and allowing this dog to assume locking position at once to prevent the operation of the second key of this group as soon as the first key is operated. For this action the two dials 17 of the first group of keys must be adjusted so that the pawls $q'$ are in the first notches thereof—that is, one step away from the cams $r$ of the dials—and therefore if either key is operated its detent and locking-dog will be operated directly through the cross-bar $1^a$, while the remaining detent $i$ and locking-dog $f$ will be operated through the stop-motion, including the ratchet, the intermediate sleeve fixed to both ratchets, and the cam-dial of the unoperated key. The cam-dial may have numbers thereon corresponding to the number of notches.

Each ratchet, it will be seen, is fixed to a sleeve which extends through the dial to the next ratchet and to which it may or may not be connected by the clutches 11 and 12. In the present case we will suppose that the second clutch from the left of Fig. 11 is loose, this being between the second and third ratchets, and that the first clutch is tightened. This will connect the first two sets of key-stop mechanisms and make a complete group of two mechanisms, while the keys to the right will belong to one or more additional groups. We are supposing that four keys compose the next group. Therefore the third, fourth, and fifth clutches, if tightened, will connect the third, fourth, fifth, and sixth ratchets and dials to move in unison, and in this group, as only three keys are to be operated and the fourth one prevented from operating, the dials must be so adjusted that the pawls $q$ will engage the third notches thereof, so that at the third movement of the dial the cam $r$ of the dials will be in position to operate the remaining detent $i$ to release its dog $f$ and lock the fourth key, whichever one that may be. The detents 13 by engaging the detent-wheels 9', connected rigidly with the ratchets, Fig. 2, stop and hold the ratchets and dial after each movement, said detents engaging square notches in the dials and being pressed into place by the springs 13', Fig. 15. When any key is operated, the depending pawl $b$, before operating the ratchet $c$, engages the detent 13 and releases it from the detent-wheel, so that the ratchet may be turned. Immediately after the ratchet-wheel has been turned the detent slips from the end of the depending pawl and holds the ratchet in its moved position, this slipping being due to the depending pawl swinging back slightly after engaging the ratchet-tooth at a point above the center of the wheel. It is necessary that all the detents of the group be operated when either key of the group is pulled, and for this purpose I provide detachable connections between the detents, so that any desired series of detents may be connected to move in unison, corresponding to the desired arrangement of the groups and the number of keys in each group. Each detent therefore has a hub 13'' fixed thereto, with lugs $s$ at the left thereof and with a reduced extension or sleeve at the right, on which the clutch-collar T is placed, said collar being fixed to the hub when desired by the thumb-screw $t'$. The collar has a projection $t^2$ fitting between the lugs $s$ of the next detent-hub at the right and when the thumb-screw is turned to fix the collar to the sleeve of the detent at the left, upon which sleeve it is supported, the detent at the right will be connected with that at the left. This is the case here, the first thumb-screw being tight to connect the two detents at the left into one group, these, however, being omitted from Fig. 11, the second being loose to break connection between the second and third detents, while the third, fourth, and fifth detents are fixed to connect the third, fourth, fifth, and sixth detents into one group. It will be understood from this that the detent-clutches are set to correspond with the ratchet-clutches, so that the grouping of said clutches will correspond with the grouping of the stop-motion ratchets and dials. These detents are not all shown in Fig. 11, those at the left of said figure being omitted for clearness of illustration. The detents $i$ are arranged to move freely about the hubs of the detents 13. We apply stop devices or wipers $u$, Figs. 11 and 16, to bear on the edges of the ratchets $c$, so that they will be stopped in proper position when returned to original position, this consisting of a disk $u'$, having a projection $u^2$, the disk being journaled loosely on the hub of the detent 13. This wiper is pressed by a spring $n^3$.

Figure 1:
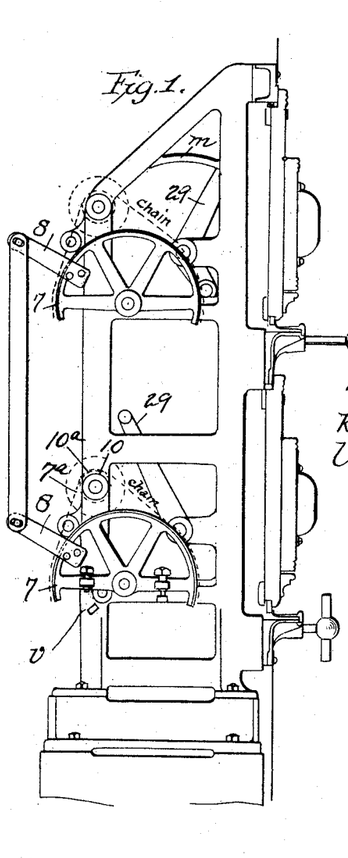
Figure 1 is an end view showing the resetting connections.
Figure 6:
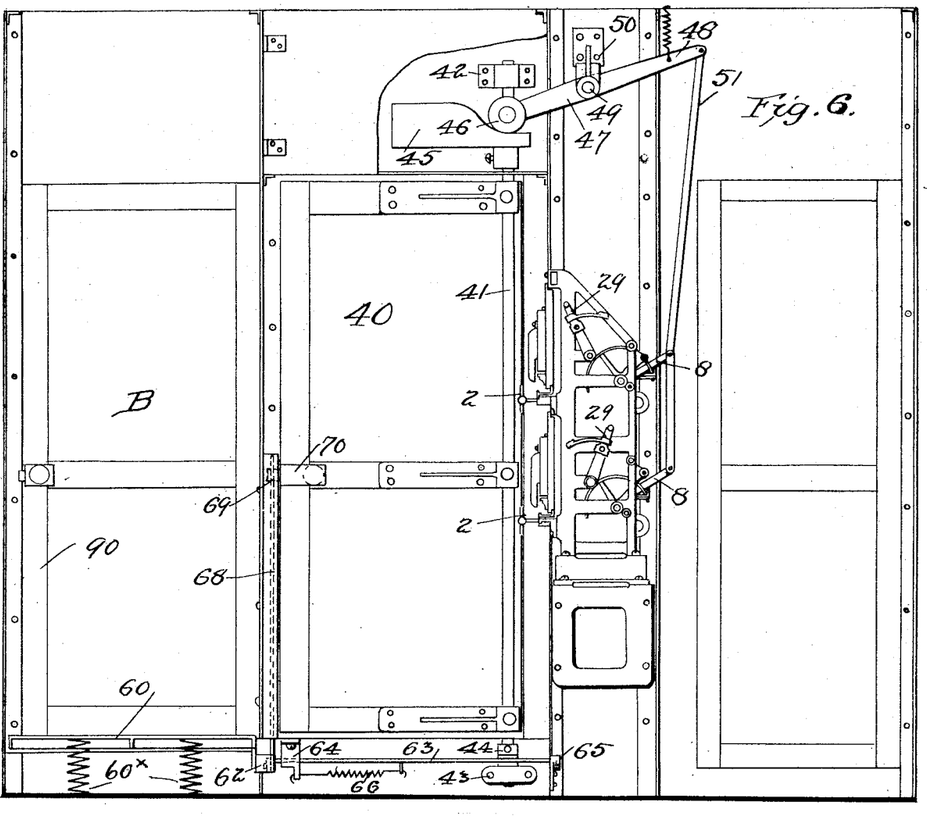
Fig. 6 is a sectional view on line $A^\times A^\times$ of Fig. 4.
Figure 7:
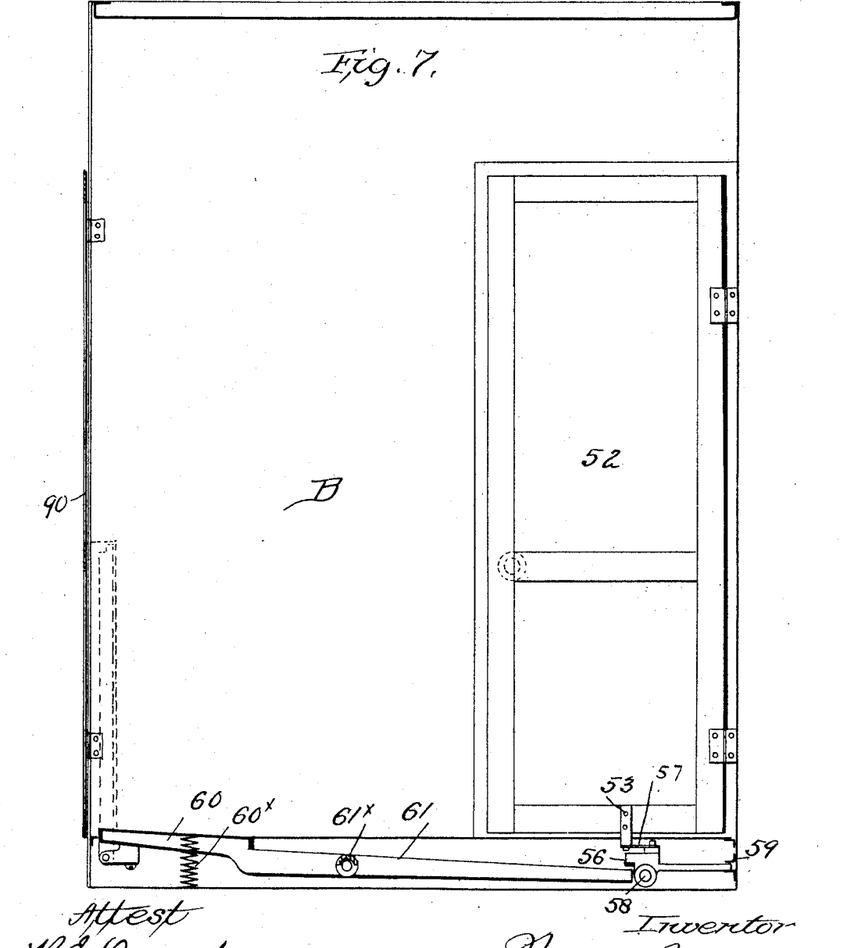
Fig. 7 is a sectional view on line $C^\times C^\times$ of Fig. 4.

In resetting the parts the locking-dogs $f$ are first released, as before explained, by turning the shaft $g$, an arm 8 on a sprocket-wheel 7, fixed to the shaft, being operated for this purpose, Figs. 1, 3, and 6. A chain $7^a$ passes from this wheel about a sprocket $10^a$ on the shaft 10 of the stop-motion, and this shaft has a cam-wiper 10' at its right-hand end adapted to operate the detent-shaft 14 through an arm $14^\times$ thereon, Figs. 11 and 22, said wiper engaging a pin $x$ on said arm. When, therefore, the arm 8 is moved, the cam-wiper engaging the pin $x$ of the arm $14^\times$ turns the shaft 14, and this, through studs 14' thereon, Figs. 11 and 16, engaging studs $13^\times$ of the hubs of detents 13, will release the detents from the detent-wheels, and the further movement of the arm 8 and shaft 10 will bring studs $10^\times$ on said shaft against the shoulders $17^\times$ of the sleeve 17', thus turning all the sleeves that have been operated, with their ratchets and dial-wheels, back to normal position, and immediately this position is reached, which is determined by an adjustable stop $v$, Fig. 1, connected with the sprocket-wheel $7^a$, the cam-wiper $10'$ releases the arm $14^\times$ by the pin $x$ riding off of the end $x^2$ of the cam-wiper, (see Fig. 22,) and all the detents 13, under the action of their springs, will fly back into engagement with their detent-wheels, the shaft 14 turning back also, with its arm $14^\times$, the latter being pivotally connected at $14^a$ to the shaft 14 to swing laterally to allow the wiper to return to normal position when the arm 8 is turned back to normal position again, a spring W serving to throw the pin $x$ of the arm $14^\times$ into its former position with its pin $x$ in line with the wiper. The cam-wiper has an inclined end at $x^2$ to force aside the pin $x$ and its arm $14^\times$. The return of the shaft 14 to normal position is due to the springs $13'$ returning the detents, which through the stud $13^\times$ and $14'$ act to return the said shaft.

Fig. 22 shows the position of the cam-wiper ready for the resetting action, its lower square shoulder or portion being in contact with the pin $x$, so that if the wiper is rotated in the direction of the arrow, Fig. 22, the arm $14^\times$ will be depressed, as shown by the arrow $y$, and the shaft 14 turned to reset the parts by means of the pins or studs $14'$ described. The wiper makes only sufficient movement to allow the pin $x$ to be freed from the end $x^2$ of the wiper when the resetting action above described takes place. In turning the wiper back to normal position the inclined end $x^2$ thereof simply moves aside the pin $x$, with the pivoted arm $14^\times$, which pin then rides against the face $x^2$ of the wiper until the normal position of Fig. 22 is reached, when the spring W returns the arm $14^\times$, with its pin, under the square end of the wiper, ready for another operation.

From the above it will be seen that the resetting is done by first releasing the detents by means of the studs on the shaft 14, then turning the ratchets and dials back to normal position by the partial revolution of the shaft 10, which brings the studs $10^\times$ thereon against the shoulder on the sleeve $17'$. Of course the parts are so arranged that although both shafts 10 and 14 turn together the studs $14'$ act to release the detents before the studs on the shaft 10 begin to act. The shaft 14 is returned to normal position when released from the cam-wiper by the spring of the detents, acting through the studs $13^\times$ $14'$.

Figure 12:
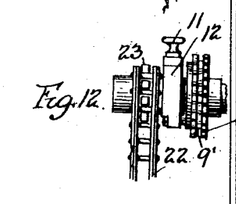
Fig. 12 is a detail view.

In having an upper and a lower set of keys it is necessary to connect the indicating or dial wheels 17 on the upper and lower shafts, which is done by the chain 22 and wheels 23, said wheels being fixed on the sleeve to which this ratchet-wheel $c$ and dial-wheels 17 are fixed. This arrangement is only used when it is necessary to transfer the same set of candidates from the lower to the upper keys; or, to make it more plain, suppose there are five candidates for the same office, but in the lower row of keys there are only one, two, three, or four keys available left in the lower row for this group. By the connection described the group is completed by bringing in one key of the upper set. A detachable clutch connection is necessary for the upper and lower sets of mechanisms similar to that described, so that the upper or lower mechanism may be disconnected. This clutch is indicated at 11 12 between the hub of the sprocket-wheel and the hub of the ratchet, as indicated in Fig. 12. It is also necessary to connect the corresponding pawls 13, and this I do by the link 25, which need not be disconnected, Figs. 2 and 3.

The voting-booth comprises a compartment A, the series of keys projecting into the same, and this compartment is entered through an entrance-door 40, carried on a shaft 41, journaled in upper and lower bearings 42 and 43, the shaft being held against vertical displacement by a cam-collar 44, secured thereto and resting on the lower bearing 43. The upper end of the shaft carries a cam 45, which as the door is open raises a roller 46 on an arm 47 of a crank-shaft 49, held in a bracket 50, secured to the frame of the booth, the arm 48 of said shaft connecting through a link 51 with the releasing-arms 8 of the upper and lower sets of voting mechanisms, so that as the door is opened the voting mechanisms will be reset for the voter who is just entering, and the resetting action takes place when the door 40 is opened very slightly, so that the voter cannot enter the compartment A until after the voting mechanism has been reset. After casting his vote the voter passes through an intermediate door 52 after having unlocked it on the inside of the compartment A, and he then passes into the compartment B. It will be understood, however, that the door 40, as well as the door 52, is self-closing, and after the voter passes through both of these doors swing to and lock automatically. The lock of the door 52 is within the compartment A. The movement of the door 52 as the voter passes through the same operates a crosshead 56 through a link 57, connected with the door by a pin 53, passing through a curved slot 54 in the bottom of the compartment B. The cross-head moves on a rod 58 and is guided by ribs 59, and as the door is opened the crosshead immediately passes over the end of a lever 61, arranged beneath the bottom of the compartment B and pivoted at $61^\times$, the platform 60, attached to said lever, projecting up slightly through an opening in the bottom of the compartment and being held normally up by a spring $60^\times$. In this position the platform is above the lower edge of the final exit-door 90, which is arranged to open inwardly, and this door cannot open until the voter stands upon the platform 60, and pressure upon the platform 60 will have no effect until the intermediate door 52 has been closed and locked, and it will therefore be necessary for the voter to cut off all communication by him to the voting-compartment A by locking the door 52 behind him before he can leave the compartment B by opening the final exit-door 90 inwardly. The depression of the platform 60 by the voter allows the door 90 to be opened, and at the same time it raises the rear end of the lever 61 in front of the cross-head 56, so that the door 52 cannot be opened until the platform 60 returns upwardly to normal position. The platform is held down by a sliding spring-bolt 63, moving in guides 64 65 under pressure of the spring 66 and bearing when the platform is up against a lug 62, (see Fig. 6,) depending from the platform and engaging the upper side of said lug when the platform is depressed, so as to hold it in this position and the door 52 locked until the main entrance is opened, when the cam 44 on the shaft 41 thereof will engage lug 67 of the bolt 63 and withdraw the same to release the platform. The entrance-door 40 is held locked by a vertically-moving bolt 68 engaging a lug 69 of the lock 70, and the bolt 68 being connected with the lug 62 of the platform 60 will hold the entrance-door 40 locked until the platform 60 is depressed, at which time the said bolt will be withdrawn and held in this position by the locking of the platform through the spring-bolt 63 until the entrance-door is opened by the next voter, which will have the effect of releasing the platform 60 and returning the bolt 68 to normal position.

Figure 18:
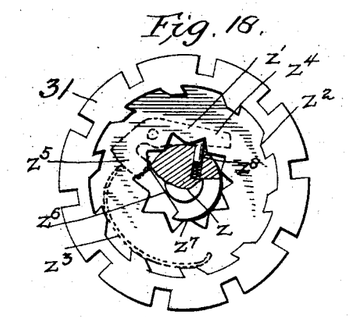

As before described, the counter consists of a series of disks, and these are arranged side by side on a stationary pin or shaft $z$, held in the lower end of the arm $31^\times$. The first or unit disk is operated by its ratchet $e$ and the pawl 30 first described, and when this disk makes a complete revolution the pawl $z'$, Figs. 18 and 19, carried on the flat face of the units-disk, will operate and move one step the second or tens disk by engaging the teeth $z^2$ around the depressed face thereof. The pawl is pressed by a spring $z^3$, and the arm $z^4$ flies outwardly under the pressure of this spring when the tailpiece $z^5$ of the pawl rides into the depressed or cut-away part of the stationary pin $z$, (shown at $z^6$,) and this action takes place once for every revolution of the units-disk, and the pawl $z'$ remains in engagement with the teeth $z^2$ sufficiently long to impart a full-step movement to the tens-disk, and then the pawl is released by its tail riding off of the depressed part of the pin and onto the concentric part thereof. The same kind of carrier mechanism is used between the tens and hundreds disks, and so on throughout the series. Each disk is provided with teeth $z^7$ about the pin to be engaged by spring-detents $z^8$, Figs. 18 and 19, which center the wheel after each step.

What I claim is—

1. In combination a series of keys, a series of counters connected therewith, a series of locking means one for each key to prevent a second operation of the key connections until after the machine is reset resetting means and supplemental locking means for the operated key to hold the same out of line with the unoperated keys, both the main and supplemental locking means being located between the keys and the counters substantially as described.

2. In combination, a series of keys, a series of counters with intermediate connections including the levers 4 locking means for each key mechanism to prevent a second operation of the same key until the machine is reset, resetting means, and locking means common to all the keys of the series to lock the machine after the voting is over, said means consisting of the bar 28 extending across the levers 4 and means for operating the bar substantially as described.

3. In combination, a series of keys, a series of counters, the vertically-movable rods 1, carrying the counting-wheels, which move therewith, the relatively-fixed pawls for operating the counting-wheels, the locking-dogs engaging teeth on the rods 1, connections between the keys, and the rods, the detents for holding the dogs out of engagement with the rods 1, said detents being operated to release the dogs in the final movement of the rods 1, substantially as described.

4. In combination, a series of keys, a series of counters, the vertically-movable rods 1, carrying the counter-wheels, the relatively-fixed pawl for operating the counter-wheels as they move with the rods, the relatively-fixed detent for holding the counter-wheels against rotation when in normal position and the supplemental pawl for alining the counter-wheels, substantially as described.

5. In combination, a series of keys, the counters, sliding rods connected to the keys and to the counters, locking means for directly engaging the said sliding rods, detents for holding the locking means out of action and cross-bars carried directly by the said sliding rods for releasing the detents to allow the direct engagement between the locking means and said sliding bars as the said bars complete their operative stroke, substantially as described.

6. In combination, a series of keys, a series of counters, sliding rods connected to the keys and to the counters, locking-dogs for the sliding rods, detents for the dogs, cross-bars on the sliding rods for releasing the detents and cam-stops for preventing more than one key operating at once, the said cross-bar engaging the said cam-stops, substantially as described.

7. In combination, the series of counters, the operating connections therefor, the series of sliding keys having slotted ends with a notch to engage a pin on the said connections, a spring for holding the key and pin in locking engagement and resetting means engaging the inclined rear end of the key to release the same from the pin, substantially as described.

8. In combination, the counters, the keys with connections thereto, the series of locking means for said connections, the supplemental locking means for the keys to hold them in operated position out of line with the unoperated keys and means for releasing the locking means of the key connections and also for releasing the supplemental locking means of the keys, both the main and supplemental locking means being located between the keys and the counters, substantially as described.

9. In combination, the keys, the counters connected therewith, the locking-dogs and the resetting means therefor consisting of the rock-shaft on which the dogs are loosely pivoted, said rock-shaft having arms to engage the locking-dogs, said rock-shaft thus serving to support the series of dogs and also to release them, substantially as described.

10. In combination, the keys, the counters connected therewith, the locking-dogs to engage said connections, the supplemental locking means for the operated keys to hold the same out of line with the unoperated keys and resetting means for releasing the connections and the keys consisting of the rock-shaft having arms to engage the dogs and to release the keys from their locks, substantially as described.

11. In combination, in a voting-machine, a series of keys, a series of counters connected therewith, stop-motion mechanisms one for each key and operating step by step upon the successive action of the keys of a group whereby all the keys of the group will be locked when the predetermined number of keys have been operated, and detachable connections between the stop-motion mechanisms independent of the key connections whereby the series of keys with their stop-motion devices may be divided into any desired groups, substantially as described.

12. In combination in a voting-machine, a group of two or more keys, the counters connected therewith, locking means for each key mechanism, adapted to operate when the key is operated and arranged independent of the lock or locks of the other key or keys and a stop-motion to set in operation the independent locking means of those keys of the group which have not been operated, said stop-motion being controlled in turn by that movement of the operated key which sets its own lock, substantially as described.

13. In combination, in a voting-machine, the keys, the counters connected thereto, the locking-dogs for the keys to lock each one as it is operated independently, and the stop-motion controlling the dogs of the inoperative keys comprising the cam-dial and the pawl and ratchet operated from the key to operate the dial, said cam-dial having a connection between it and the dog, substantially as described.

14. In combination, in a voting-machine, the keys, the counters connected thereto, the locking-dogs for the keys to lock each one as it is operated independently, the cam-dials, the detents between the same and the locking-dogs, and the pawl and ratchet for operating the dial step by step to cause the same to operate the independent detents and dogs of the unoperated keys, substantially as described.

15. In combination, in a voting-machine, the keys, the counters, the independent locking-dogs for the keys arranged to lock each key when operated, and the stop-motion controlling said dogs comprising the pawl and ratchet, the cam-dial operated thereby with a connection therefrom to a dog and means for holding the dial adjustably in relation to the pawl and ratchet and the dog, whereby the dial will operate to control the locking-dog, after one or more keys have been operated on as desired.

16. In combination, in a voting-machine, the keys, the counters, the locking-dogs, the stop-motion for controlling one or more dogs comprising the dial loosely mounted and having a cam to operate a locking-dog, a pawl and ratchet for operating the dial adapted to be operated by a key, and the adjustable connection between the pawl and ratchet and the dial comprising the arm connected with the ratchet and detachably and adjustably connected with the dial, substantially as described.

17. In combination, the keys, the counters, the locking-dogs for the keys, the detents for releasing the dogs, each key controlling its detent and locking means directly and the stop-motion operated by the keys to operate the detent or detents of the remaining keys after the predetermined number of keys have been operated, substantially as described.

18. In combination, the keys and counters connected thereto, the locking-dogs, each key controlling its own dog to release the same, a stop-motion comprising a pawl and ratchet and a cam-dial for each key having a connection with the locking-dog thereof, said pawl and ratchet being operated by its key, and detachable connections between the series of ratchets with their dials whereby the keys may be arranged to operate in groups, substantially as described.

19. In combination, the keys, and counters connected therewith, the locking-dogs, the ratchets to be operated by the keys, and having laterally-extending sleeves or hubs, the shaft carrying the same, the dials arranged on the ratchet-hubs and connected thereto, the detachable connection between the hub of one ratchet and the adjoining ratchet and a connection between the dials and the locking-dogs, substantially as described.

20. In combination, the keys and the counters connected therewith, the locking-dogs, the ratchets arranged to be operated by the keys and having hubs or sleeves, the dials connected with the ratchets, the shaft carrying the ratchets and hubs loosely, means for turning the shaft, in resetting the ratchets and dial and the projection on the shaft for returning the parts, substantially as described.

21. In combination, the keys, and the counters connected therewith, the independent locking means for the keys, each key mechanism being arranged to operate its own lock, and means for operating the independent key-lock of one key through the operation of the other key or keys comprising a dial-wheel connected to said key-lock with means by which the dial-wheel is operated step by step by the operation of the keys, substantially as described.

22. In combination, the keys, the counters connected thereto, the series of locking means for the key mechanism, and the stop-motion comprising the dial-wheels with connections to the locking means, the series of pawls and ratchets operated by the key connections, and the series of ratchet-detents arranged to be released by the pawls, substantially as described.

23. In combination, the keys, the counters connected thereto, the locking means and the stop-motion comprising the dial-wheels with connections to the locking means, the pawls and ratchets operated by the key connections for moving the dial-wheels step by step, the ratchet-detents arranged to be operated by the movements of its key mechanism, detachable connections between the sets of dials and ratchets and detachable connections between the ratchet-detents whereby the dials and ratchets with the detents may be grouped as desired, substantially as described.

24. In combination, the keys, the counters, connected thereto, the locking means for the key mechanisms, the stop-motion comprising the dials with connections to the locking means and the pawls and ratchets for turning the dials, and the ratchet-detents arranged to be operated by the pawls of the dial-ratchets and to be released therefrom when the said pawls have made their full movement, and the spring for throwing the detent back into place, substantially as described.

25. In combination, the keys, the counters with connections thereto, locking means for said keys and connections, the stop-motion mechanisms comprising the dial with connections to the locking means, the ratchet and pawl for operating the dial at each key action, the rotary shaft on which the dial and ratchet are loosely mounted said shaft being arranged for returning the dial and ratchet to normal position, the ratchet-detent and means for releasing the same when the dial is being reset, substantially as described.

26. In combination, the key, the counters with connections thereto, the locking means for the key connections, the stop-motion mechanisms comprising the dial-wheel with connection to the locking means, the pawl and ratchet for operating the dial, the rock-shaft carrying the dial and ratchet, the ratchet-detent, the rock-shaft carrying the same loosely, said shafts when rocked being adapted to return the dial and ratchet to normal position and release the detent from the ratchet and means for operating the shafts, substantially as described.

27. In combination, the keys, the counters connected thereto, the locking means for the key connections, the stop-motion mechanisms arranged to be advanced one step for each key action, the detent for holding the stop-motion in moved position and the rock-shafts for resetting the stop-motion and detent said shafts carrying the stop-motion and detents loosely and having portions to contact with said parts with the cam-wiper and pivoted arm connection between the shafts, substantially as described.

28. In combination, the upper and lower sets of keys, the counters connected with the keys, the cam-stops for preventing two or more keys operating at the same time and arranged to receive the key connection between them and the connecting-bar between the upper and lower sets of cam-stops connected thereto to be moved when the keys are forced in between the locks, said connection being secured to both the upper and lower cam-stops to operate the one from the other, substantially as described.

29. In combination, the upper and lower sets of keys, the counters connected with the keys, the locking means for the key mechanism, the stop-motion mechanisms, one for each key and the detachable connections between the stop-motion of each set of keys and the detachable connection between one stop-motion of the upper and lower sets of keys, substantially as described.

30. In combination, in a voting-machine, the key mechanisms, the counters operated thereby, the plurality of resetting rock-shafts, the sprocket chain and wheels connected to said plurality of resetting rock-shafts, the arm 8, the link 51, and an entrance-door with connections to said link, substantially as described.

31. In combination, in a voting-machine, the voting mechanism, the booth having a voting-compartment and an exit-compartment, an entrance-door, a lock for said door and a depressible platform connected to the lock for operating the same, said platform being located within the exit-compartment.

32. In combination, in a voting-machine, the voting mechanism, the booth having a voting-compartment, an exit-compartment with a final exit-door, an intermediate door and a lock for the same in the exit-compartment released by the entrance-door, said lock being arranged to be set automatically by the exit of the voter from the booth, substantially as described.

33. In combination, in a voting-machine, the voting mechanism, the booth having a voting-compartment an exit-compartment with a final exit-door, a door between the two compartments, locking means therefor arranged to be released by opening the entrance-door, said locking means serving to lock the final exit-door on the inside when the intermediate door is released, substantially as described.

34. In combination, in a voting-machine, the voting mechanism, the booth having the voting-compartment, the exit-compartment, the door between the two, the final exit-door, the platform adjacent thereto to be depressed in the exit-compartment, said platform when raised locking the final exit-door by directly obstructing the inner side of the exit-door and a lock for the entrance-door operated when the platform is depressed to release the said door, substantially as described.

35. In combination, in a voting-machine, the voting mechanism, the booth having the voting-compartment, the exit-compartment, the door between, the final exit-door, the platform for holding the same normally locked when the intermediate door is closed, said intermediate door being arranged to positively hold the platform against depression, while the intermediate door is open, said platform being arranged to be depressed by the weight of the voter upon it, substantially as described.

36. In combination, in a voting-booth, the voting mechanism, the booth having a voting-compartment, the entrance-door, the platform the intermediate door arranged to be held locked when the platform is depressed, the locking-bolt for holding the platform depressed, and the connections between the same and the entrance-door, whereby the platform releases the intermediate door when the entrance-door is opened, substantially as described.

37. In combination in a voting-booth, the voting mechanism, said booth having a compartment the doors leading to and from the same, and the vertically-movable platform between the doors arranged to lock the same alternately and also to unlock the same alternately, said platform being depressible by the weight of the voter to positively unlock one of said doors and lock the other.

38. In combination, the voting mechanism, the voting-booth having the voting and exit compartments, the final exit-door, the intermediate door, the platform arranged to hold the exit-door closed, said platform being pivotally supported and having a rear extension below the floor of the exit-compartment, and the cross-head connected with the intermediate door, and arranged to engage the rear extension of the platform, substantially as described.

39. In combination, the voting mechanism, the booth having a voting and an exit compartment, with a door between, a final exit-door, a platform adjacent thereto to hold the final exit-door locked when raised and to lock the intermediate door when depressed, and means for releasing the platform, substantially as described.

40. In combination, the voting mechanism, the booth having a voting and an exit compartment with a door between, having a lock in the voting-compartment, an entrance-door to the voting-compartment, a final exit-door, a platform adjacent thereto to hold the same locked when raised, a lock for the entrance-door connected to the platform to be unlocked when the same is depressed, a lock to hold the platform depressed connected to and controlled by the entrance-door, said platform controlling also the opening of the intermediate door, substantially as described.

41. In combination, the voting mechanism, the booth having the voting and exit compartments arranged side by side with a door between and with the entrance and final exit doors arranged side by side and a platform arranged adjacent to the exit-door to hold the same locked when raised, a lock for the entrance-door controlled by the platform, said platform being pivotally supported and having a rear extension to control and be controlled by the intermediate door, substantially as described.

42. In combination in a voting-machine, the counters, a series of keys, the sliding toothed rods 1 connected to the counters, means for returning the rods to normal position after each action, the locking-dogs to engage the toothed rods to hold them against a second operation, means for controlling the dogs to release the same when the keys are operated so that said dogs may engage the toothed rods, and the loose locking connection between the toothed rods and the keys adapted to lock the keys in operated position out of line with the unoperated keys, substantially as described.

In testimony whereof I affix my signature in presence of two witnesses.

WERNER JOHNSON.

Witnesses:
W. M. SMITH,
FRED W. READIO.